US007058552B2

(12) United States Patent
Stothert et al.

(10) Patent No.: US 7,058,552 B2
(45) Date of Patent: Jun. 6, 2006

(54) OPTIMIZING PLANT CONTROL VALUES OF A POWER PLANT

(75) Inventors: Alec Stothert, Ennetbaden (CH); Eduardo Gallestey Alvarez, Taegerig (CH); Markus Ahrens, Baden-Rütihof (CH); Marc Antoine, Gretzenbach (CH); Steve Morton, Neuenhof (CH)

(73) Assignee: ABB Research Ltd, Zurich (CH)

( * ) Notice: Subject to any disclaimer, the term of this patent is extended or adjusted under 35 U.S.C. 154(b) by 992 days.

(21) Appl. No.: 10/021,344

(22) Filed: Dec. 19, 2001

(65) Prior Publication Data

US 2002/0120352 A1    Aug. 29, 2002

(30) Foreign Application Priority Data

Dec. 21, 2000  (EP)  ................... 00811220

(51) Int. Cl.
*G06F 17/10*  (2006.01)
*G06G 7/48*  (2006.01)
*G05B 13/02*  (2006.01)

(52) U.S. Cl. ................... 703/2; 703/6; 700/36
(58) Field of Classification Search .......... 703/2, 703/6; 700/36
See application file for complete search history.

(56) References Cited

U.S. PATENT DOCUMENTS 5,331,579 A * 7/1994 Maguire et al. ............... 703/2
5,347,466 A   9/1994 Nichols et al.
5,886,895 A   3/1999 Kita et al.

OTHER PUBLICATIONS

G. Kralj et al. "Multiobjective Programming in Power System Organization: New Approach to Generator Maintenance Scheduling" International Journal of Electrical Power and Energy Systems, vol. 16, No. 4, Aug. 1994, pp. 211-220, XP001001102, UK.
D. Lin et al., "Optimal System Design Considering Warranty, Periodic Preventive Maintenance, and Minimal Repair" Journal of the Operational Research Society, vol. 51, No. 7 Jul. 2000, pp. 869-875, XP001001320, UK.
J. Rupe et al. "Optimal-Maintenance Modeling on Finite Time with Technology Replacement and Changing Repair Costs" Proceeding of the 46th International Symposium on Reliability and Maintainability-Product Quality and Integrity, Jan. 24, 2000, pp. 269-275, XP001001268, USA.

(Continued)

*Primary Examiner*—Hugh Jones
(74) *Attorney, Agent, or Firm*—Buchanan Ingersoll PC

(57) ABSTRACT

In a method and computer program product for optimizing power plant control values and a power plant optimizing system an optimization module (1) minimizes total plant operation costs while achieving predetermined required output values for produced power and process steam. This is done by, at a given time, determining future values of control values and simulating, in a simulation module (2), the behavior of the plant up to a given future time. Corresponding fuel costs and generated power are determined in the simulation, and incorporated in an objective function. The optimization module (1) minimizes the objective function by varying the control values. According to the invention, a rate of ageing of plant components is determined when simulating the future behavior of the plant, and the objective function to be minimized comprises said rate of ageing.

9 Claims, 1 Drawing Sheet

OTHER PUBLICATIONS

C. Su et al. "Minimazation of the Life Cycle Cost for a Multistate System Under Periodic Maintenance" International Journal of Systems Science, vol. 31, No. 2, Feb. 2000, pp. 217-227, XP001001321, UK.

A. Ahmad et al. "A Practical Model for Generator Maintenance Scheduling with Transmission Constraints" Electrical Machines and Power Systems, vol. 28, No. 6, Jun. 2000, pp. 501-513, XP001001322, USA.

* cited by examiner

OPTIMIZING PLANT CONTROL VALUES OF A POWER PLANT

FIELD OF THE INVENTION

The invention relates to the field of process control, in particular to a method and computer program product for optimizing power plant control values and a power plant optimizing system as described in the preamble of claim 1, 7 and 8, respectively.

BACKGROUND OF THE INVENTION

Methods and systems for optimizing power plant operation are shown in U.S. Pat. No. 5,347,466 and U.S. Pat. No. 5,886,895. In both cases, plant operation, which is controlled by control values generated by a control system, is optimized in order to minimize fuel costs while achieving predetermined required output values for produced power and process steam. This is done by, at a given time, determining future values of control values and simulating a behavior of the plant up to a given future time. From the simulation, fuel costs are determined and a objective function comprising the fuel costs and costs for buying power from another source is computed. In order to determine optimal control values, the control values are varied and the simulation is repeated until a minimum of the objective function is found. However, such an optimization is constrained by the fact that predetermined operating limits of the plant may not be exceeded. This has the effect that the optimization does not necessarily give a financially optimal result for the plant owner.

SUMMARY OF THE INVENTION

It is an object of the invention to create a method and computer program product for optimizing power plant control values and a power plant optimizing system of the type mentioned initially that overcomes the deficiencies mentioned above.

These objects are achieved by a method and computer program product for optimizing power plant control values and a power plant optimizing system according to the claims 1, 7 and 8.

In the inventive method and computer program product for optimizing power plant control values and a power plant optimizing system, a rate of ageing of plant components is determined when simulating a future behavior of the plant, and an objective function to be minimized by the optimization comprises said rate of ageing.

In this way, the invention incorporates long term financial effects of component ageing into short term decisions on plant operation. For example, under certain conditions and when energy prices are high, the optimization shall indicate that it is financially advantageous to operate the plant outside normal conditions, i.e. that higher revenue from generated power more than compensates for higher maintenance or replacement costs due to increased component degradation.

In a preferred variant of the invention, plant output values representing plant production are determined in the simulation and a difference between said plant output values and demand values is included in the objective function.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
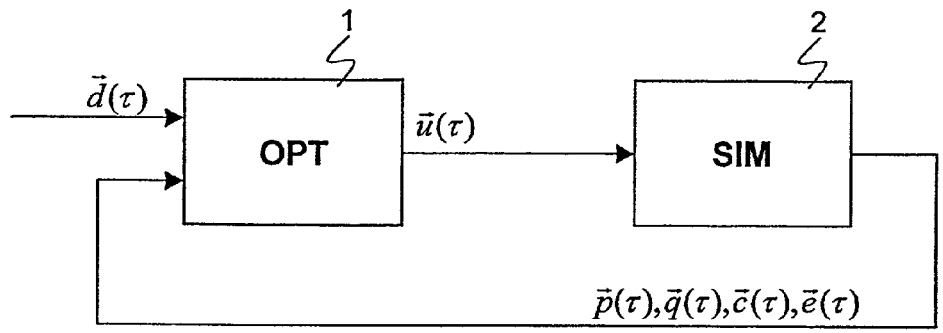
FIG. 1 shows a block diagram corresponding to the invention.

FIG. 1 shows a block diagram corresponding to the invention. An optimization module 1 is provided with demand values $\vec{d}(\tau)$. The optimization module 1 generates power plant operating parameters or control values $\vec{u}(\tau)$ that are input to a simulation module 2. The simulation module 2 comprises a simulation model of an actual power plant 3 and determines values for a power plant output or production $\vec{p}(\tau)$, revenue values $\vec{q}(\tau)$ from selling the produced output, costs $\vec{c}(\tau)$ associated with a given power plant output, and values of a rate of ageing $\vec{e}(\tau)$ of plant components. The values determined by the simulation module 2 are input to the optimization module 1.

The values $\vec{d}(\tau)$, $\vec{u}(\tau)$, $\vec{p}(\tau)$, $\vec{q}(\tau)$, $\vec{c}(\tau)$, $\vec{e}(\tau)$ mentioned above are, in general, vectors that change over time, i.e. each vector represents a trajectory in a multidimensional space. For example, $\vec{d}(\tau)$ represents an changing amount of electric power and of process steam to be generated over the next hour or day.

The control values $\vec{u}(\tau)$ represent plant input or operation parameters that are used to control the plant, such as valve and guide vane positions, or set points for local controllers of temperature, fuel flow or steam flow. From a trajectory of control values $\vec{u}(\tau)$ that is given for a time interval from a present time t to a future time t+T, where T is called "prediction horizon" or "optimization horizon", the simulation model determines a trajectory of the state of the power plant, i.e. the values of a plurality of variables that represent the state of the plant as it changes with time. From the state trajectory, trajectories $\vec{p}(\tau)$, $\vec{q}(\tau)$, $\vec{c}(\tau)$, $\vec{e}(\tau)$ for the values output by the simulation module 2 are determined for said time interval. In a preferred embodiment of the invention, the simulation model is a dynamic model of the power plant and its components.

The production $\vec{p}(\tau)$ represents the amount of electric power and process steam that would be generated if the control values $\vec{u}(\tau)$ were applied to the actual power plant 3. The revenue term $\vec{q}(\tau)$ represents revenues from selling the electric power and process steam and is computed by multiplying the production with a price per unit of production. Computing the revenue $\vec{q}(\tau)$ preferably includes power prices that vary over time, either because agreements for providing a given amount of power at a given price and at a given time exist, or because estimates about future spot market power prices are available.

The costs $\vec{c}(\tau)$ are computed from the fuel useage, fuel costs, and process efficiencies required to produce, $\vec{p}(\tau)$. The fuel consumption and process efficiencies are computed using a plant simulation model and depend directly on the plant control values $\vec{u}(\tau)$. Associating fuel costs with outputs is done, for example, by assigning all fuel costs to electric power output and considering the produced steam as a free by-product, and assigning additional fuel costs to the steam output, if they arise because a higher steam production is required than would be produced at the required level of electrical power The rate of ageing $\vec{e}(\tau)$ represents costs associated with a reduction of lifetime of plant components. Plant components are e.g. pressurized vessels, pipes or turbine blades. They are designed to withstand normal operating conditions for a given amount of time, i.e. their lifetime under nominal conditions. Subjecting a component to more severe operating conditions such as higher temperatures or temperature gradients increases component degradation and reduces component lifetime. This in turn increases long term costs for operating the power plant. According to the invention, an effect on these long term costs is included in the total operating costs.

The rate of ageing $\vec{e}(\tau)$ is computed from models associated with various plant components, such as the following models, which are well know to one versed in the art:

Microcrack growth rate models for components operating at elevated temperatures, such as boiler pressure parts, steam pipes and steam turbine rotors. See for example "Life Assessment Technology for Fossil Power Plants", R. Viswanathan, Proc. American Power Conf., Vol. 57-III: 1749–1768, 1995 and "A Lifetime Prediction Model for Thermomechanical Fatigue based on Microcrack Propagation", M. P. Miller et. al, ASTM STP 1186, 1993, pp. 35–49.

Corrosion, oxidation, and erosion models based on extensions to microcrack growth models as described in "Corrosion Fatigue: Mechanics, Metallurgy, Elctrochemistry, and Engineering", T. Crooker and B. Leis editors, ASTM 1983.

Mechanical and thermomechanic stress models to determine stresses created in plant components, e.g. stresses in a steam turbine rotor shaft due to load oscillations and/or steam temperature changes.

The rate of ageing $\vec{e}(\tau)$ represents the plant lifetime consumption or an asset value degradation expressed as a financial value under operating conditions caused by the control values $\vec{u}(\tau)$. The entries in $\vec{e}(\tau)$ correspond to the aging rate for each plant component and are, for example, computed directly from $$\frac{R}{a_{crit}} \frac{da}{dr},$$

where $a_{crit}$ is a predefined critical crack length for said component, a is the crack length computed using the models described above and dependent on $\vec{u}(\tau)$, and, R, is the component, cost, repair, or maintenance cost.

In the inventive method, the following steps are performed a) The optimization module 1 determines the trajectory of plant control values $\vec{u}(\tau)$ from the present time t for a predetermined duration T and transmits said plant control values $\vec{u}(\tau)$ to the simulation module 2. The first time that this step is executed, plant control values are e.g. set to constant values for the duration T or are determined from stored standard trajectories corresponding to a given operating condition such as a plant startup or a load change. Later executions of this step preferably use a variation of the plant control values $\vec{u}(\tau)$ of an earlier step.

b) The plant model incorporated in the simulation module 2 determines from the trajectory of control values $\vec{u}(\tau)$, by simulation of the power plant behavior, a trajectory of the state of the power plant. From said state, corresponding trajectories of costs $\vec{c}(\tau)$ for operating the plant and trajectories of revenues $\vec{q}(\tau)$ from selling produced output are determined, as well as the rate of ageing $\vec{e}(\tau)$ of plant components. In a preferred embodiment of the invention, trajectories of plant output values $\vec{p}(\tau)$ are determined as well.

c) A total operating cost J[u] is computed as an integral of an objective function that comprises the rate of ageing $\vec{e}(\tau)$ and a difference between costs $\vec{c}(\tau)$ and revenues $\vec{q}(\tau)$. In a preferred embodiment of the invention, this total operating cost J[u] is defined as the functional $$J[u] = \int_t^{t+T} R_1 \vec{e}(\tau) + R_3 [\vec{c}(\tau) - \vec{q}(\tau)] d\tau,$$

where $R_1$, $R_3$ are weighting matrices. The weighting matrices determine a relative influence of the magnitude of each component of each of the different vectors $\vec{q}(\tau)$, $\vec{c}(\tau)$, $\vec{e}(\tau)$.

In a preferred embodiment of the invention, the above objective function also includes a difference between plant output values $\vec{p}(\tau)$ and demand values $\vec{d}(\tau)$ In this embodiment, the total operating cost J[u] is preferably defined as $$J[u] = \int_t^{t+T} R_1 \vec{e}(\tau) + R_2 [\vec{d}(\tau) - \vec{p}(\tau)]^2 + R_3 [\vec{c}(\tau) - \vec{q}(\tau)] d\tau,$$

where $R_1$, $R_2$, $R_3$ are weighting matrices. The terms in the objective function are interpreted as follows. The "d($\tau$)–p($\tau$)" term represents a penalty associated with not satisfying the required power output. The "c($\tau$)–q($\tau$)" term represents costs minus revenue, i.e., an economic performance indicator.

d) Steps a) through c) are repeated iteratively, with the optimization module varying the trajectory of plant control values u:[t, t+T]R" until an optimized lower total operating cost J[u] is arrived at. As the functions $\vec{q}(\tau)$, $\vec{q}(\tau)$, $\vec{c}(\tau)$, $\vec{e}(\tau)$ depend upon plant control values $\vec{u}(\tau)$, the optimization routine finds a strategy $u^*:[t, t+T]R''$ that minimizes the total operating cost $J[u]$.

Examples for units are, for the rate of ageing e: $ per second for costs c or revenue q $ per kW or $ per kg steam per second for R1: dimensionless for R2: $/kW^2 or $(s/kg)^2.

for R3: kW or kg per second for demand d or production p: kW or kg per second

In another preferred embodiment of the invention, the objective function is $$J[u] = \int_t^{t+T} R_1 \vec{e}(\tau) + R_2 \left[\vec{d}(\tau) - \vec{p}(\tau)\right]^2 + R_3 \vec{c}(\tau) - R_4 \vec{q}(\tau) d\tau,$$

where costs and revenues are weighted separately, using an additional weighting matrix $R_4$, which allows for the cost and revenue vectors $\vec{c}(\tau)$, $\vec{q}(\tau)$ to have different dimensions.

The optimization step c) involves the problem of how to find the optimal solution efficiently, since the search space determined by the plurality of plant control values and the duration T is large. Standard optimization procedures may be used, or dedicated solutions as described, for example, in U.S. Pat. No. 5,347,466, U.S. Pat. No. 5,886,895 or in "The Generalized Unit Commitment Problem", Ross Baldick, IEEE Transactions on Power Systems, 10(1):465–475, February 1995.

In a preferred embodiment of the invention, at time t, the control strategy, i.e. the future values $u:[t, t+T]R''$ corresponding to optimal plant operation, is displayed graphically to an operator, providing him with guidance for controlling the plant.

Figure 2:
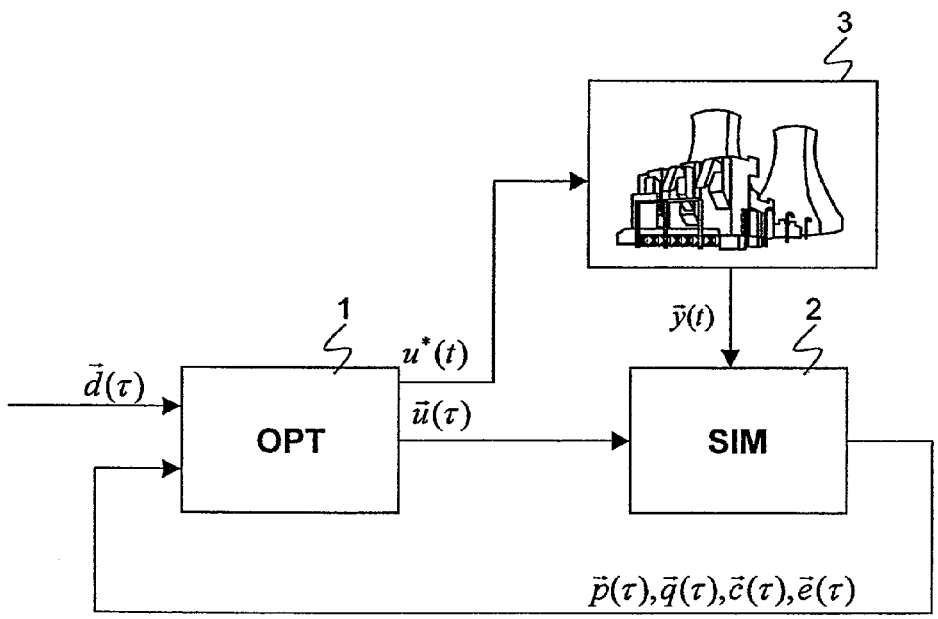
FIG. 2 shows a block diagram corresponding to a preferred embodiment of the invention.

FIG. 2 shows a block diagram corresponding to another preferred embodiment of the invention, in which, at time t, the control value $u^*(t)$ is applied to the actual power plant 3, resulting in automatic optimized plant operation. Preferably, measured plant values $\vec{y}(t)$ of the plant are input to the simulation module 2 in order to update the simulation model. Appropriate modeling and model update techniques are well known from the field optimal control. In particular, receding horizon control techniques might result useful. The power plant is, for example, a gas turbine, a combined cycle power plant, or of a boiler-turbine-generator type.

A computer program product according to the invention comprises a computer readable medium, having thereon: computer program code means to make, when said program is loaded in a computer that is operationally connected to a power plant, the computer execute the method according to one of claims 1 to 6. A computer program according to the invention comprises said computer program code.

A power plant optimizing system that optimizes plant control values according to the invention comprises a) an optimization module 1 that is configured to determine a plurality of trajectories of plant control values $\vec{u}(\tau)$ and to determine a total operating cost $J[u]$ as an integral of an objective function that comprises a difference between costs $\vec{c}(\tau)$ and revenues $\vec{q}(\tau)$ that are associated with operating the power plant according to the plant control values $\vec{u}(\tau)$, and b) a simulation module 2 that is configured to determine, from the trajectory of plant control values $\vec{u}(\tau)$, by simulation of the power plant's behavior, corresponding trajectories of costs $\vec{c}(\tau)$ for operating the plant and trajectories of revenues $\vec{q}(\tau)$ from selling produced output.

The simulation module 2 is configured to determine, from the trajectory of plant control values $\vec{u}(\tau)$, a trajectory representing a rate of ageing $\vec{e}(\tau)$ of plant components. The objective function comprises said rate of ageing $\vec{e}(\tau)$.

In a preferred embodiment of the power plant optimizing system, the simulation module 2 is configured to determine, from the trajectory of plant control values $\vec{u}(\tau)$, plant output values $\vec{p}(\tau)$, and the objective function comprises a difference between plant output values $\vec{p}(\tau)$ and associated demand values $\vec{d}(\tau)$.

The invention allows the operator or an automatic controller to incorporate not only short term financial considerations into a plant operation strategy, but also long term financial considerations that involve maintenance and replacement costs and their dependency on operating conditions.

| List of designations | |
|---|---|
| 1 | optimization module |
| 2 | simulation module |
| 3 | actual power plant |
| $\vec{u}(\tau)$ | control values |
| $\vec{p}(\tau)$ | production |
| $\vec{c}(\tau)$ | costs |
| $\vec{d}(\tau)$ | demand |
| $\vec{q}(\tau)$ | revenue |
| $\vec{e}(\tau)$ | rate of ageing |
| $\vec{y}(t)$ | measured plant values |
| $R_1, R_2, R_3$ | weight matrices |

The invention claimed is:

1. A method for optimizing power plant control values, where the method comprises the steps of
   a) determining a trajectory of plant control values,
   b) determining from the trajectory of plant control values, by simulation of the power plant's behavior, corresponding trajectories of costs for operating the plant and trajectories of revenues from selling produced output,
   c) computing a total operating cost as an integral of an objective function that comprises a difference between costs and revenues,
   d) iteratively repeating steps a) through c) with the optimization module varying the trajectory of plant control values until an optimized lower total operating cost is arrived at,
wherein in step b), by modeling of plant components, a trajectory representing a rate of ageing of plant components is determined from the trajectory of plant control values, and that, in step c), the objective function comprises said rate of ageing.

2. Method according to claim 1, wherein, in step b) trajectories of plant output values are determined, and that, in step c) the objective function comprises a difference between plant output values and associated demand values.

3. Method according to claim 1, wherein the total operating cost is computed as $$J[u] = \int_t^{t+T} R_1 \vec{e}(\tau) + R_3 [\vec{c}(\tau) - \vec{q}(\tau)] d\tau,$$

where $R_1$, $R_3$ are weighting matrices, t is a present time and T is a predetermined duration.

4. Method according to claim 2, wherein the total operating cost is computed as $$J[u] = \int_t^{t+T} R_1 \vec{e}(\tau) + R_2 [\vec{d}(\tau) - \vec{p}(\tau)]^2 + R_3 [\vec{c}(\tau) - \vec{q}(\tau)] d\tau,$$

where $R_1$, $R_2$, $R_3$ are weighting matrices, t is a present time and T is a predetermined duration.

5. Method according to claim 1, wherein at least part of the trajectory of plant control values corresponding to the optimized lower total operating cost is displayed to an operator.

6. Method according to claim 1, wherein at least part of the trajectory of plant control values corresponding to the optimized lower total operating cost is used to control the actual plant 3.

7. A computer program product comprising a computer readable medium, having thereon: computer program code means to make, when said program is loaded in a computer that is operationally connected to a power plant, the computer execute the method according to claim 1.

8. A power plant optimizing system that optimizes plant control values and comprises
   a) an optimization module that is configured to determine a plurality of trajectories of plant control values and to determine a total operating cost as an integral of an objective function that comprises a difference between costs and revenues that are associated with operating the power plant according to the plant control values,
   b) a simulation module that is configured to determine, from the trajectory of plant control values, by simulation of the power plant's behavior, corresponding trajectories of costs for operating the plant and trajectories of revenues from selling produced output,
wherein the simulation module is configured to determine, from the trajectory of plant control values, a trajectory representing a rate of ageing of plant components, and that the objective function comprises said rate of ageing.

9. A power plant optimizing system according to claim 8, wherein the simulation module is configured to determine, from the trajectory of plant control values, plant output values, and that the objective function comprises a difference between plant output values and associated demand values.

* * * * *